United States Patent
Narayanan et al.

(10) Patent No.: US 12,063,146 B2
(45) Date of Patent: Aug. 13, 2024

(54) IN-SERVICE SWITCH-OVER OF FUNCTIONALITY OF A NETWORK OPERATING SYSTEM OF A NETWORK SWITCH

(71) Applicant: Dell Products L.P., Round Rock, TX (US)

(72) Inventors: Padmanabhan Narayanan, Chennai (IN); Narayanaswamy Perumal, Chennai (IN); Chitra Raghavan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 17/896,150

(22) Filed: Aug. 26, 2022

(65) Prior Publication Data
US 2024/0073089 A1 Feb. 29, 2024

(51) Int. Cl.
*H04L 41/082* (2022.01)
*G06F 1/20* (2006.01)
*G06F 11/07* (2006.01)
*G06F 11/20* (2006.01)
*G06F 11/30* (2006.01)
*H04L 41/0816* (2022.01)

(52) U.S. Cl.
CPC ............ *H04L 41/082* (2013.01); *G06F 1/206* (2013.01); *G06F 11/0709* (2013.01); *G06F 11/2035* (2013.01); *G06F 11/3058* (2013.01); *H04L 41/0816* (2013.01)

(58) Field of Classification Search
CPC ... H04L 41/082; H04L 41/0816; G06F 1/206; G06F 11/0709; G06F 11/2035; G06F 11/3058

USPC ......................................................... 714/4.1
See application file for complete search history.

(56) References Cited

U.S. PATENT DOCUMENTS

2012/0230344 A1* 9/2012 Haddock ............... H04L 49/253
370/401

OTHER PUBLICATIONS

Wikipedia "failover" page, retrieved from https://web.archive.org/web/20220602093659/https://en.wikipedia.org/wiki/Failover (Year: 2022).*
Dell, "Integrated Dell Remote Access Controller 6 (iDRAC6)" User's Guide, Version 1.95, Mar. 2013, 372 pages.
(Continued)

*Primary Examiner* — Yair Leibovich
(74) *Attorney, Agent, or Firm* — Ryan, Mason & Lewis, LLP

(57) ABSTRACT

An apparatus comprises a first processing device configured to manage, in a first mode of operation, one or more first tasks for a network switch, and to replicate, in the first mode of operation, state information for a network operating system of the network switch, the network operating system running on a second processing device in the first mode of operation. The first processing device is also configured to initiate, in response to one or more trigger conditions, an in-service switch-over from the first mode of operation to a second mode of operation. The first processing device is further configured to suspend, in the second mode of operation, at least one of the one or more first tasks, and to run, in the second mode of operation, at least a portion of the network operating system utilizing the replicated state information.

20 Claims, 7 Drawing Sheets

(56) References Cited

OTHER PUBLICATIONS

Dell EMC, "Using MLAG in Dell Networking N-Series Switches." A Dell EMC Deployment and Configuration Guide, Sep. 2016, 87 pages.
Broadcom Corporation, "A Scalable Approach to Gigabit Ethernet Switch Design," White Paper, Jun. 27, 2002, 28 pages.
Dell, "Dell Networking S3100 series," Specification Sheet, Version 1.6, Jul. 2016, 2 pages.
Dell, "A Dell Deployment and Configuration Guide Using MLAG in Dell Networks." A Dell Deployment and Configuration Guide, Mar. 2014, 21 pages.
Dell, "Dell Networking Z9500 fabric switch: Data center use cases with "Pay-As-You-Grow" licensing," Rev 1.0, Jul. 2014, 10 pages.
Dell EMC, "Dell EMC Networking S6010-On Switch," Specification Sheet, Version 1.6, Mar. 2017, 4 pages.
Dell Technologies, "Dell EMC Powerswitch S4048-ON Switch," Specification Sheet, Version 2.0, Jun. 2020, 4 pages.
Dell Technologies, "Dell Powerswitch Z9264F-ON," Specification Sheet, Version 1.9, May 2022, 5 pages.
Dell Technologies, "Enterprise SONiC Distribution by Dell Technologies," Specification Sheet, Version 1.7, Apr. 2022, 3 pages.
Dell, "Dell Networking Configuration Guide for the C9000 Series," Version 9.9, Oct. 2015, 1148 pages.
Dell Technologies, "Dell EMC Z9100-ON Series Switches," Specification Sheet, Version 2.6, May 2020, 4 pages.
Juniper Networks, "Junos OS: Multichassis Link Aggregation User Guide for Routing and Switching Devices," Jun. 29, 2022, 559 pages.
Cisco, "Multichassis Link Aggregation Group for L3VPN," in MPLS: Layer 3 VPNs Configuration Guide, Cisco IOS XE Fuji 16.7.x, Aug. 2, 2018, 6 pages.
Nvidia, "Non-Transparent Bridging and PCle Interface Communication," https://docs.nvidia.com/drive/drive_os_5.1.6.1L/nvvib_docs/index.html#page/DRIVE_OS_Linux_SDK_Development_Guide/System%20Programming/sys_components_non_transparent_bridging.html, Accessed Aug. 25, 2022, 5 pages.

* cited by examiner

IN-SERVICE SWITCH-OVER OF FUNCTIONALITY OF A NETWORK OPERATING SYSTEM OF A NETWORK SWITCH

FIELD

The field relates generally to information processing, and more particularly to network management in information processing systems.

BACKGROUND

Network switches may be deployed for interconnecting computing devices in a data center or other information processing system. In some data centers, top of rack (ToR) switching is used for connecting computing devices within a rack to an in-rack network switch. In other data centers, end of row (EoR) switching is used for connecting computing devices along multiple racks in a same row. With these and other switching designs, it is desired to provide a highly available and resilient switch fabric to provide increased uptime for workloads and applications and to comply with fault tolerance requirements.

SUMMARY

Illustrative embodiments of the present disclosure provide techniques for performing in-service switch-over of functionality of a network operating system of a network switch.

In one embodiment, an apparatus comprises a first processing device comprising a processor coupled to a memory. The first processing device is configured to perform the steps of managing, in a first mode of operation, one or more first tasks for a network switch and replicating, in the first mode of operation, state information for a network operating system of the network switch, the network operating system running on a second processing device in the first mode of operation. The first processing device is also configured to perform the step of initiating, in response to one or more trigger conditions, an in-service switch-over from the first mode of operation to a second mode of operation. The first processing device is further configured to perform the steps of suspending, in the second mode of operation, at least one of the one or more first tasks, and running, in the second mode of operation, at least a portion of the network operating system utilizing the replicated state information.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
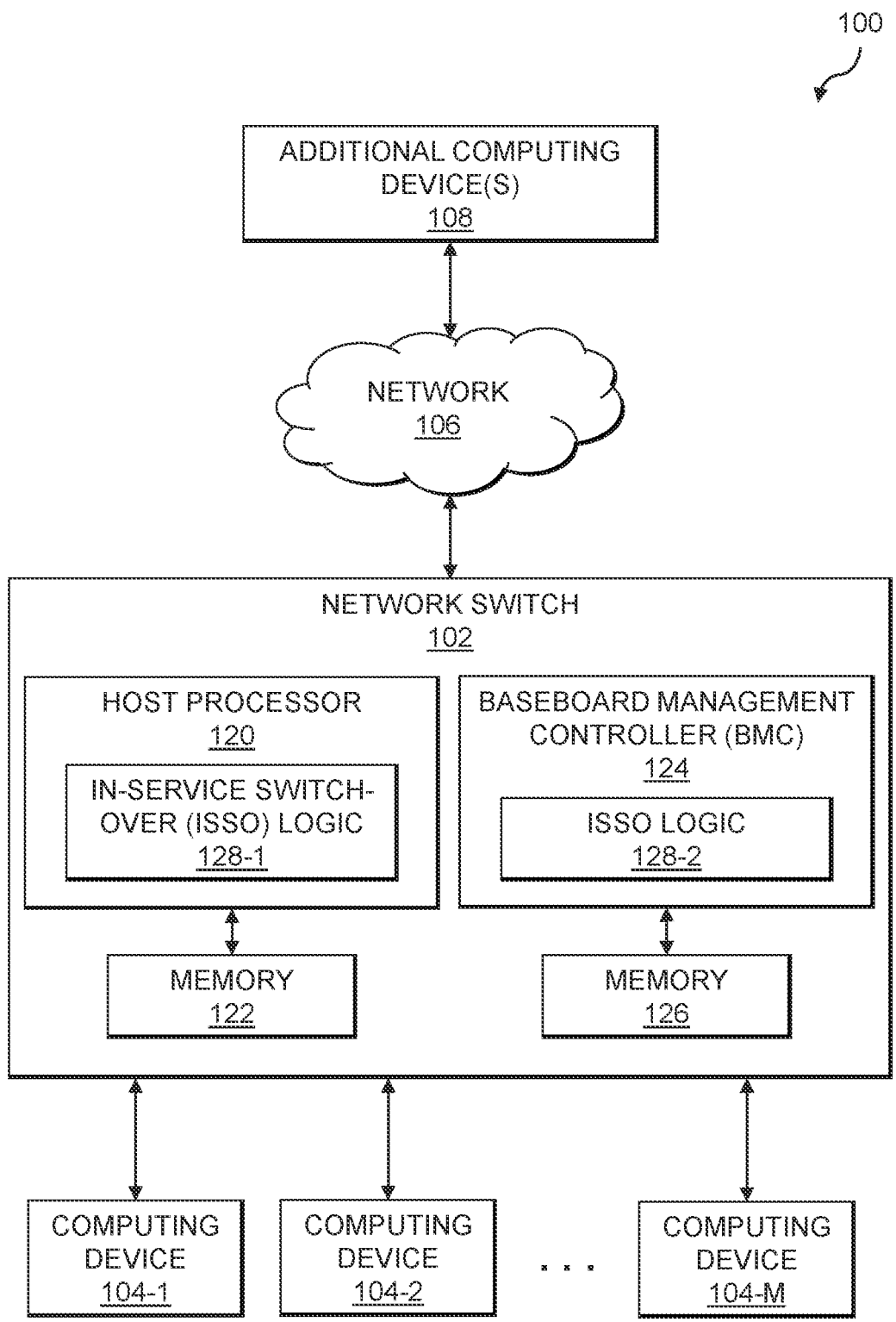
FIG. 1 is a block diagram of an information processing system configured for performing in-service switch-over of functionality of a network operating system of a network switch in an illustrative embodiment.

FIG. 1 shows an information processing system 100 configured in accordance with an illustrative embodiment. The information processing system 100 is assumed to be built on at least one processing platform and provides functionality for in-service switch-over (ISSO) within a network switch 102 that couples a plurality of computing devices 104-1, 104-2, . . . 104-M (collectively, computing devices 104) to one or more additional computing devices 108 via a network 106.

The computing devices 104 and 108 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The computing devices 104 and 108 may also or alternately comprise virtualized computing resources, such as virtual machines (VMs), containers, etc.

The computing devices 104 and 108 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art. In some embodiments, the computing devices 104 and 108 comprise assets of an IT infrastructure operated by an enterprise.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks. Although shown as external to the network 106, the network switch 102 may in some cases be part of or internal to the network 106.

In some embodiments the network switch 102 is used for interconnecting the computing devices 104 with the network 106 (and the additional computing devices 108) as part of an enterprise system (e.g., an IT infrastructure comprising the computing devices 104 and/or computing devices 108). As used herein, the term "enterprise system" is intended to be construed broadly to include any group of systems or other computing devices. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

In some embodiments, one or more of the computing devices 104 and/or 108 comprise storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, scale-out NAS clusters, content addressable storage systems, or flash-based storage systems. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the network switch 102, as well as to support communication between the network switch 102 and other related systems and devices not explicitly shown.

The network switch 102 in the FIG. 1 embodiment is assumed to be implemented using at least one processing device. Each such processing device generally comprises at least one processor and an associated memory, and implements one or more functional modules or logic for controlling certain features of the network switch 102. In the FIG. 1 embodiment, the network switch 102 includes a host processor 120 coupled to memory 122 and a baseboard management controller (BMC) 124 coupled to memory 126. The host processor 120 and BMC 124 implement respective ISSO logic 128-1 and 128-2. The ISSO logic 128-1 and ISSO logic 128-2 are configured to implement ISSO for various functionality of the network switch 102 in response to various conditions or triggers.

During normal operation, the host processor 120 may run a network operating system (NOS) of the network switch 102, and the BMC 124 may run its own operating system (OS), referred to as a BMC OS, that handles designated functionality of the network switch 102, such as thermal management and control (e.g., of one or more fans of the network switch 102), remote management (e.g., for enabling users to remotely access the network switch 102 via one or more management or console ports), etc. The ISSO logic 128-1 and ISSO logic 128-2 may also coordinate replication of the state of the NOS control plane (e.g., from memory 122 to memory 126), such that in response to detecting one or more conditions or triggers, the BMC 124 may provide a "warm" standby for ISSO of NOS functionality whereby the BMC 124 will take over at least some designated core functionality of the NOS of the network switch 102.

In response to detecting one or more conditions or triggers, the ISSO logic 128-1 of the host processor 120 initiates with the ISSO logic 128-2 of the BMC 124 a switch-over, whereby the BMC 124 will take over at least some designated core functionality of the NOS of the network switch 102. As the BMC 124 may have limited resources relative to the host processor 120, not all of the functionality of the NOS may be run on the BMC 124. Further, at least some of the functionality handled by the BMC 124 in the normal mode of operation may be suspended or altered in response to the ISSO of the NOS functionality to the BMC 124. For example, thermal management of the network switch 102 may be suspended or altered in response to the ISSO of the NOS functionality to the BMC 124. This may include, for example, setting all fans of the network switch 102 to run at an increased or maximum speed while the BMC 124 runs the designated core functionality of the NOS of the network switch 102.

The ISSO of NOS functionality to the BMC 124 allows various operations to be performed on the NOS running on the host processor 120. The particular operations performed may be based on the specific trigger or condition which initiated the ISSO to the BMC 124. For example, a user may trigger the ISSO to the BMC 124 in order to upgrade the NOS running on the host processor 120, to upgrade firmware of the host processor 120, etc. As another example, the ISSO to the BMC 124 may be triggered on detecting one or more issues with the NOS running on the host processor 120, where the ISSO enables such issues to be patched or fixed, or the NOS to be restarted on the host processor 120. The ISSO logic 128-2 may further enable ISSO of the NOS functionality back to the host processor 120 (e.g., a return to the "normal" operating mode).

It is to be appreciated that the particular arrangement of the network switch 102, the computing devices 104, the network 106 and the computing devices 108 illustrated in the FIG. 1 embodiment is presented by way of example only, and alternative arrangements can be used in other embodiments. As discussed above, for example, the network switch 102 may be implemented internal to the network 106. As another example, the functionality associated with the ISSO logic 128-1 and 128-2 may be separated across more modules or logic, with the multiple modules or logic possibly being implemented with multiple distinct processors or processing devices.

At least portions of the ISSO logic 128-1 and 128-2 may be implemented at least in part in the form of software that is stored in memory and executed by a processor.

It is to be understood that the particular set of elements shown in FIG. 1 for ISSO of NOS functionality of the network switch 102 is presented by way of illustrative example only, and in other embodiments additional or alternative elements may be used. Thus, another embodiment may include additional or alternative systems, devices and other network entities, as well as different arrangements of modules and other components.

The network switch 102 and other portions of the system 100, as will be described in further detail below, may be part of cloud infrastructure.

The network switch 102, the computing devices 104, the network 106, the computing devices 108 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The network switch 102, the computing devices 104, the network 106 and the computing devices 108, or components thereof, may be implemented on respective distinct processing platforms, although numerous other arrangements are possible. For example, in some embodiments at least portions of the network switch 102 and one or more of the computing devices 104 are implemented on the same processing platform. A given computing device (e.g., 104-1) can therefore be implemented at least in part within at least one processing platform that implements at least a portion of the network switch 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the network switch 102, the computing devices 104, the network 106 and the computing devices 108, or portions or components thereof, to reside in different data centers. Numerous other distributed implementations are possible.

Additional examples of processing platforms utilized to implement the network switch 102, the computing devices 104, the network 106, the computing devices 108 and other components of the system 100 in illustrative embodiments will be described in more detail below in conjunction with FIGS. 5 and 6.

It is to be appreciated that these and other features of illustrative embodiments are presented by way of example only, and should not be construed as limiting in any way.

Figure 2:
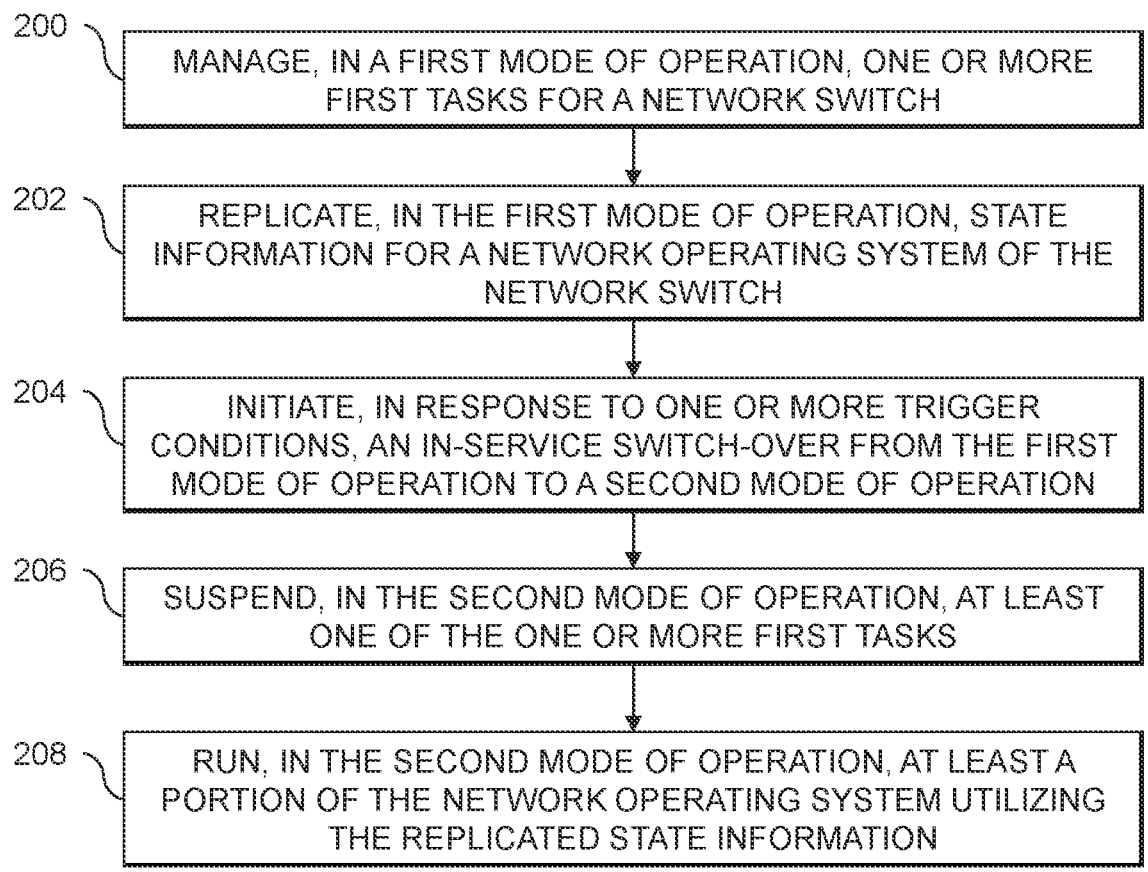
FIG. 2 is a flow diagram of an exemplary process for performing in-service switch-over of functionality of a network operating system of a network switch in an illustrative embodiment.

An exemplary process for performing ISSO of functionality of a NOS of a network switch will now be described in more detail with reference to the flow diagram of FIG. 2. It is to be understood that this particular process is only an example, and that additional or alternative processes for performing ISSO of functionality of a NOS of a network switch may be used in other embodiments.

In this embodiment, the process includes steps 200 through 208. These steps are assumed to be performed by the host processor 120 and the BMC 124 of the network switch 102 utilizing the ISSO logic 128-1 and 128-2. The process begins with step 200, managing, in a first mode of operation utilizing the BMC 124, one or more first tasks for the network switch. In step 202, in the first mode of operation, state information for a NOS of the network switch 102 is replicated from the host processor 120 to the BMC 124 (e.g., from the memory 122 to the memory 126), where the host processor 120 runs the NOS in the first mode of operation. In step 204, an ISSO from the first mode of operation to a second mode of operation is initiated in response to one or more trigger conditions. The BMC 124, in the second mode of operation, suspends at least one of the one or more first tasks in step 206. The BMC 124, in the second mode of operation, runs at least a portion of the NOS in step 208 (e.g., utilizing the state information replicated in step 202 in the first mode of operation).

The one or more first tasks for the network switch 102 may comprise one or more thermal management tasks, and step 206 may comprise suspending the one or more thermal management tasks. Step 206 may include setting a fan speed of one or more fans of the network switch to a designated speed (e.g., a maximum fan speed) and disabling thermal monitoring of the network switch 102.

The state information replicated in step 202 may comprise at least one of: port configuration information for one or more ports of the network switch 102; one or more interface tables; one or more routing tables; one or more forwarding database tables; one or more address resolution protocol tables; one or more network access control lists; and quality of service policy information.

The network switch 102 may comprise a network processing unit (NPU) that is coupled to the BMC 124 over a first link and the host processor 120 over a second link different than the first link. The first link may comprise a remote central processing unit (RCPU) link and the second link may comprise a peripheral component interconnect express (PCIe) link. The BMC 124 and the host processor 120 may be coupled over a third link different than the first link and the second link.

Step 208 may comprise running a subset of functionality of the NOS. The subset of the functionality of the NOS may comprise management of a control plane of a NPU of the network switch 102, the NPU being coupled to a plurality of ports of the network switch 102. The subset of the functionality of the NOS may comprise one or more drivers for the NPU of the network switch 102 and one or more software containers providing control plane functionality for the NPU of the network switch 102.

The one or more trigger conditions may comprise at least one of: a planned trigger condition associated with a user-initiated switch-over for enabling one or more upgrades of the NOS running on the host processor 120; and an unplanned trigger condition associated with a failure of the NOS running on the host processor 120. The BMC 124 may further initiate an additional ISSO from the second mode of operation back to the first mode of operation, the additional ISSO being performed in response to one or more other trigger conditions. At least one of the one or more other trigger conditions may comprise expiration of a designated period of time since the ISSO from the first mode of operation to the second mode of operation.

In accordance with disaggregation trends, network operating system (NOS) and network processing unit (NPU) application-specific integrated circuit (ASIC) vendors have implemented various network switch vendor-independent mechanisms to achieve high availability. Many network switches are configured with a BMC (e.g., such as an Integrated Dell Platform Controller (IDPC)). The BMC is used for various tasks, including but not limited to remote switch management, firmware upgrades, power control, thermal monitoring, event and indicator (e.g., light-emitting diode (LED)) management, Serial over LAN (SOL), etc. At runtime, thermal monitoring and control (e.g., of fans of a network switch) is one of the most crucial tasks managed by the BMC. Unlike in the server context, the BMC of a network switch is not typically utilized by end users extensively. In illustrative embodiments, the BMC of a network switch is utilized to support ISSO. To support ISSO, on detecting a switch-over condition (e.g., host processor or NOS failure, in response to a user request), most of the functions of the BMC operating system (OS) may be paused or suspended to enable the BMC OS to take up critical control plane functionality of the NOS.

The technical solutions described herein configure a network switch to run ISSO components on a NOS of a host processor (e.g., a host central processing unit (CPU)) as well as on an OS of a BMC. The ISSO component running on the NOS of the host processor is referred to herein as an ISSO-NOS component or agent, while the ISSO component running on the OS of the BMC is referred to herein as an ISSO-BMC component or agent. The ISSO-NOS and ISSO-BMC components are connected over a dedicated link (e.g., that connects the host processor and the BMC). The ISSO-NOS component replicates NPU tables and a state database (DB) to the ISSO-BMC component. Upon specific failure events or in response to a user request, the ISSO-NOS component shuts down the host processor link to the NPU of the network switch and instructs the ISSO-BMC component to become active. When the ISSO-BMC component becomes active, the BMC OS scales down "normal" BMC OS functionality (e.g., such as thermal monitoring, remote monitoring, etc.) and enables a link (e.g., a remote CPU (RCPU) link) between the NPU and the BMC for a "warm" restart of the network switch control plane on the BMC OS.

The BMC of a network switch is designed to be simple, low powered, and with limited resources. The BMC is not meant for hosting complex software or running major tasks, such that using the BMC as a standby with full functionality of a NOS is not realistic. The technical solutions described herein enable a relatively simple, low-powered BMC to take over critical functionality of a NOS in the event of a failure of a host processor of the network switch or other designated conditions. It is extremely complex and costly to have two instances of the NOS (e.g., running on distinct host processors) to manage the same NPU. The technical solutions described herein do not require two instances of the NOS that manage the NPU simultaneously. During steady or normal state, the NOS running on the host processor uses its link (e.g., a peripheral component interconnect express (PCIe) link) to manage the NPU. Only when the host processor relinquishes control does the NPU get controlled (e.g., over an RCPU link) by the control plane on the BMC. In other words, the NPU management is mutually exclusive between the host processor and the BMC.

Pipelines or data links between the BMC and the host processor, as well as the interface used for communication therebetween (e.g., Intelligent Platform Management Interface (IPMI)) are not designed to be used for exchanging large amounts of data in real-time and in an efficient manner. In some embodiments, a one gigabit (1G) link is sufficient to handle typical Control Plane Policing (CoPP) scenarios.

Advantageously, the technical solutions described herein are independent of any vendor-specific BMC. While various embodiments are described with respect to use of an IDPC or an Integrated Dell Remote Access Controller (iDRAC)-like environment for the BMC, this is not a requirement. The technical solutions described herein can reduce design complexity and improve cost effectiveness, such that various other types of BMCs that are part of otherwise conventional network switches may be configured as described herein to support high availability (HA) and ISSO. The technical solutions described herein may utilize various HA, state replication and switch-over mechanisms across homogeneous/symmetric processors. The technical solutions described herein may leverage a dual-use onboard control processor on a network switch (e.g., a BMC) to take the role of an active control plane for a NPU on-demand, based on planned or unplanned triggers, where the NPU is dual ported (e.g., with an PCIe link to the host processor, and an RCPU port to the BMC). Thus, the technical solutions described herein provide crucial HA support without the complexity and cost of a separate processor subsystem.

A fundamental objective of network architects is to build a highly available and resilient fabric. Customers often mandate fault tolerance and rapid convergence of network fabric for their business needs. With ever-growing data center and cloud-centric workloads and applications, it is important to mitigate downtime in the network fabric. In order to align with such trends, NOS and NPU ASIC vendors have implemented various network switch vendor-independent mechanisms to achieve HA and address both planned (e.g., reboots or software upgrades of a NOS running on a host processor) as well as unplanned (e.g., link or node failures of the host processor) events.

A variety of fast, warm and soft reboot techniques are provided by various NOSes with little to no disruption to the control and data plane to handle software upgrades. When it comes to switch failures, redundant uplinks take care of border leaf/spine/super-spine failures. However, HA strategies at the server-to-top of rack (ToR) level may vary based on several factors. If servers have dual-ported network interface cards (NICs), a dual ToR network switch configuration using multi chassis link aggregation groups (MC-LAGs) is a preferred but very expensive solution for enterprises. Essentially, any chosen solution is influenced by a variety of factors, including: cost; server, NIC and NOS capabilities; the ability to handle configuration changes; the perception and incident of various failures; appetite for maintenance windows; the mission criticality of applications; etc.

ToR network switch failures may occur for various reasons. Excluding power loss and link or optic failures, the main reasons for ToR network switch failures are due to disk, memory, or host processor-NPU link (e.g., PCIe link) issues and crashing NOS processes. Such issues are confined to the host processor. The technical solutions described herein provide an approach that has lower cost and complexity, which leverages an IDPC or other type of BMC as a warm standby for the NOS running on the host processor.

In some embodiments, an IDPC or other BMC is configured as a dual use control processor complex on a network switch, with the IDPC or other BMC being primarily used for thermal management, system management and remote access control (e.g., during "normal" operation). The IDPC or other BMC takes on the role of an active control plane for a NPU on-demand or dynamically based on planned or unplanned triggers from a host processor complex (or a NOS running thereon), where the NPU is dual ported with a first link (e.g., a PCIe link) to the host processor and a second link (e.g., an RCPU link) to the IDPC or other BMC. During a host processor failure, or failure of a NOS running thereon, the IDPC or other BMC OS pauses or suspends most of its primary functions (e.g., thermal management, system management, remote access functions, etc.) in favor of taking over the NOS's critical control plane functionality. ISSO of the NOS's critical control plane functionality to the IDPC or other BMC enables high availability, isolating the host processor for issue analysis and providing seamless failover.

Figure 3:
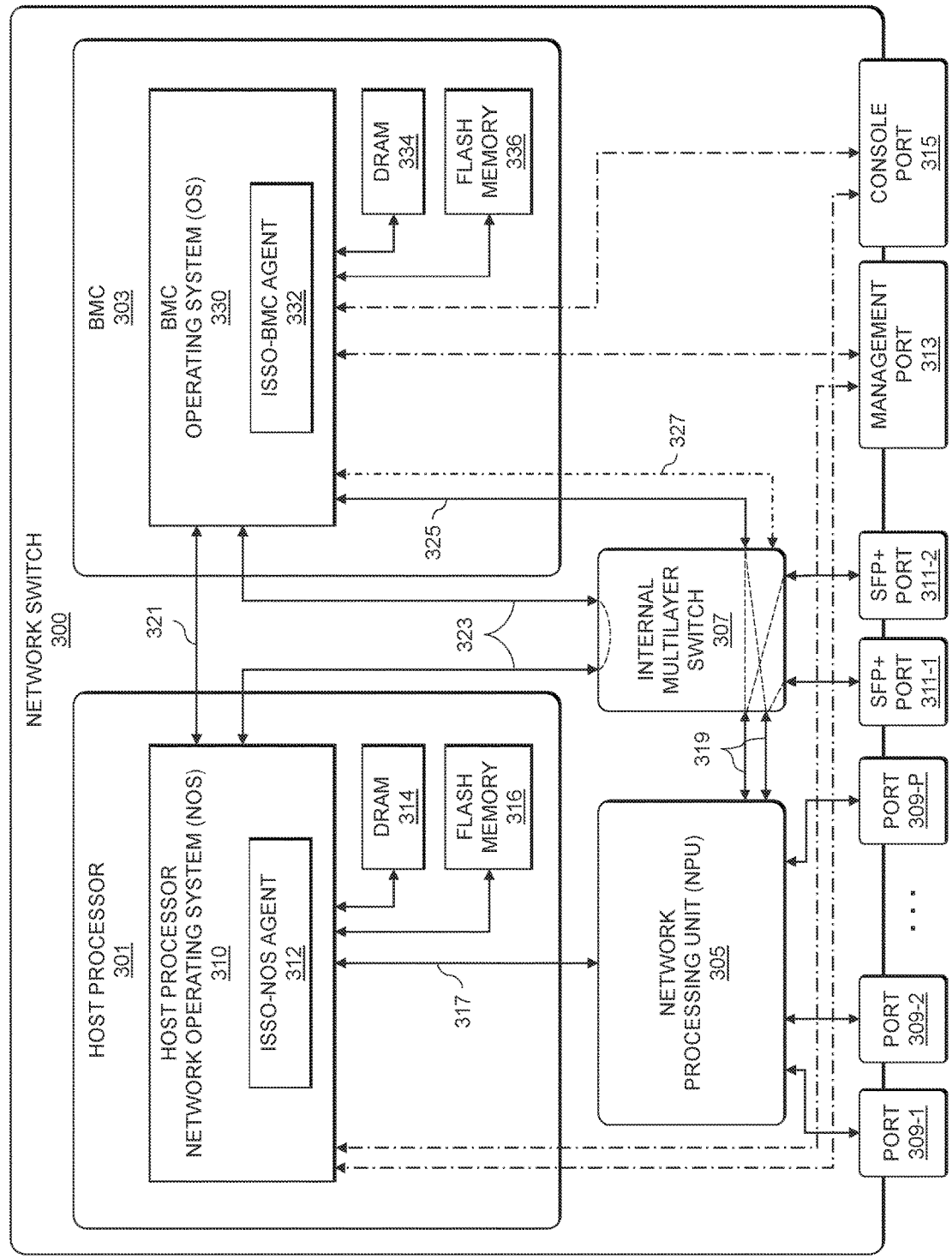
FIG. 3 is a block diagram of a network switch configured for in-service switch-over in an illustrative embodiment.

FIG. 3 shows a configuration of a network switch 300, which includes a host processor 301 (e.g., a host CPU), a BMC 303, a NPU 305 (e.g., an NPU ASIC), an internal multilayer switch 307, ports 309-1, 309-2, . . . 309-P (collectively, ports 309), enhanced small form factor pluggable (SFP+) ports 311-1 and 311-2 (collectively, SFP+ ports 311), a management (e.g., Ethernet) port 313, and a console port 315. The management port 313 and the console port 315 may comprise respective RJ45 ports. The host processor 301 runs a host processor NOS 310 implementing ISSO-NOS agent 312, while the BMC 303 runs a BMC OS 330 implementing ISSO-BMC agent 332. The host processor NOS 310 is coupled to dynamic random-access memory (DRAM) 314 and flash memory 316, while the BMC OS 330 is coupled to DRAM 334 and flash memory 336. The NPU 305 is coupled to the ports 309. The NPU 305 is also coupled to the SFP+ ports 311 via the internal multilayer switch 307. The management port 313 and console port 315 are coupled to the host processor NOS 310 and BMC OS 330. The host processor NOS 310 is coupled to the NPU 305 via link 317 (e.g., a PCIe link). The NPU 305 is coupled to the internal multilayer switch 307 via links 319. The links 319 may be switched via the internal multilayer switch 307 to couple to either the SFP+ ports 311 or the BMC OS 330 via the NPU-BMC link 325 (e.g., an RCPU link) or an optional link 327 (e.g., a PCIe link). The host processor NOS 310 and BMC OS 330 may be coupled directly via link 321 (e.g., a Serial Peripheral Interface (SPI) link, an inter-Integrated Circuit (I2C) link, a System Management Bus (SMBus) link, a Universal Serial Bus (USB) link, a Local Procedure Call (LPC) link, a PCIe link, etc.) or via the internal multilayer switch 307 using the host processor-BMC link 323.

The network switch 300 includes P front-end switch ports 309 (e.g., where P may be 32), as well as the two SFP+ ports 311 where transceivers may be inserted. The host processor NOS 310, which runs on the host processor board (e.g., a CPU board's host CPU System on a Chip (SoC)), implements the control plane and programs the NPU 305 over link 317 (e.g., a PCIe link). The NOS may include a Software for Open Networking in the Cloud (SONiC) NOS, a Linux-based open network OS such as OS10, various other third-party NOSes, etc.

As described above, the host processor 301 and BMC 303 may be connected using various interfaces (e.g., SPI, I2C, SMBus, USB, LPC, PCIe, etc.), shown as link 321 in FIG. 3. The BMC 303 runs the BMC OS 330, which is primarily used during runtime for network switch thermal control, remote management, etc. A host processor-BMC link 323 between the host processor NOS 310 and BMC OS 330 is used for replicating a state DB (e.g., including port configurations, interface tables, forwarding database (FDB) tables, Address Resolution Protocol (ARP) tables, routing tables, a network Access Control List (ACL), Quality of Service (QoS) policies, etc.) between the host processor NOS 310 and the BMC OS 330, as well as for triggering ISSO. The host processor-BMC link 323 is used until switch-over to the BMC OS 330 for control plane management of the NPU 305. The NPU-BMC link 325 (e.g., an RCPU link) is used after such switch-over of control plane management to the BMC OS 330. The internal multilayer switch 307 is an optional component which may be used in cases where the NPU 305 of the network switch 300 does not have spare ports for the links 323 and 325. The internal multilayer switch 307 is managed by the BMC OS 330 over link 327 (e.g., a PCIe link). If the BMC 303 does not have sufficient ports, the internal multilayer switch 307 may be used for switching and sharing a single link from the BMC 303 for both the host processor-BMC link 323 and the NPU-BMC link 325, since the host processor-BMC link 323 is used prior to switch-over and the NPU-BMC link 325 is used post switch-over. The BMC 303 is assumed to have sufficient multi-core capability and associated DRAM 334 to run a Dockerized or other containerized NPU control plane.

When the NOS image of the host processor NOS 310 is built, a subset of the NOS functionality (e.g., NPU drivers and control plane dockers or containers) are built (e.g., cross-compiled) to be run as part of the BMC OS 330. The subset of the NOS functionality can advantageously provide a lightweight version of the capabilities that are supported in the NOS. ISSO agents run on the host processor NOS 310 and the BMC OS 330, shown as ISSO-NOS agent 312 and ISSO-BMC agent 332, respectively. The ISSO-NOS agent 312 and ISSO-BMC agent 332 coordinate the NPU 305 DB replication as well as handshakes during failover.

Figure 4A:
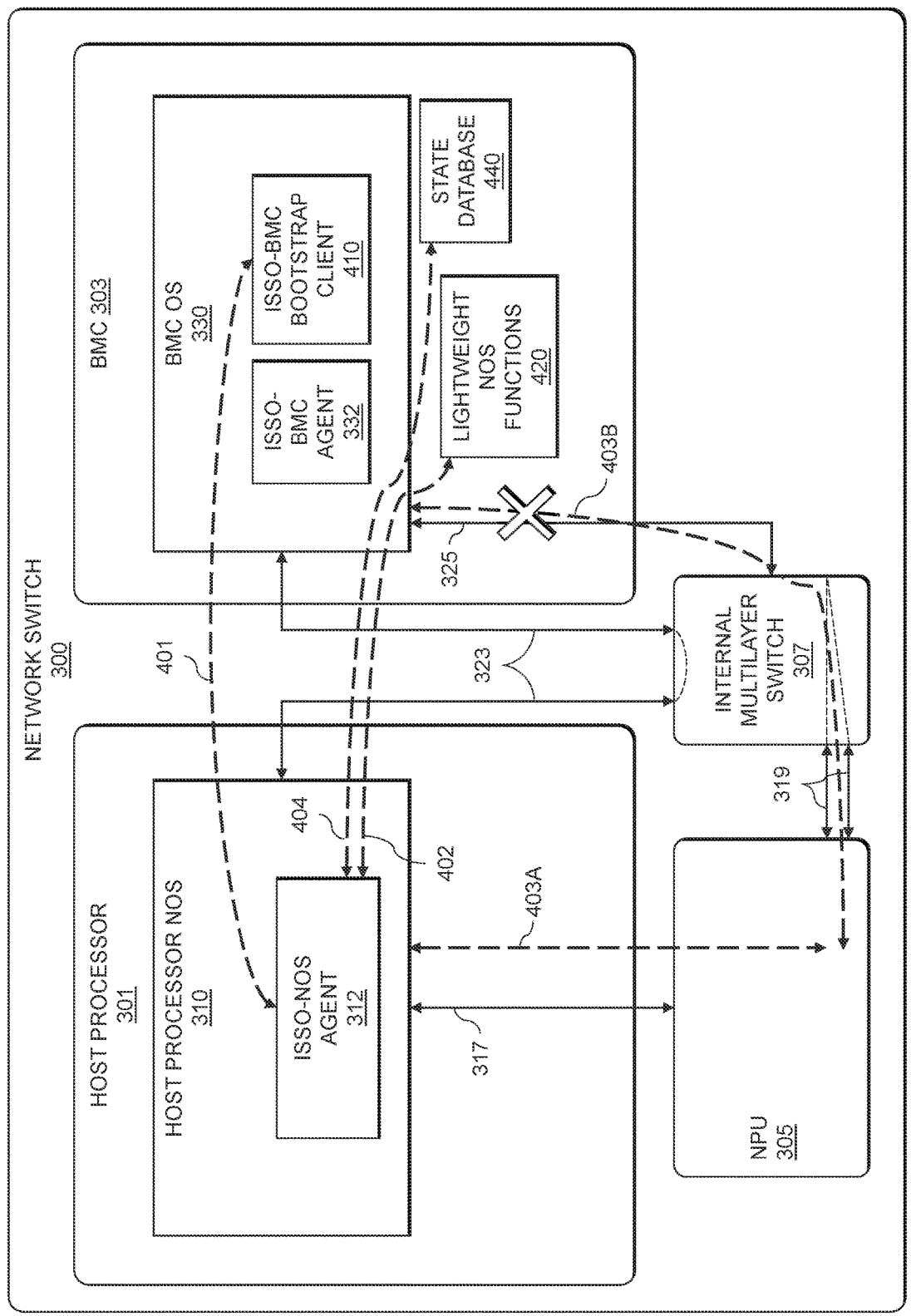
FIGS. 4A and 4B show system flows for in-service switch-over using the FIG. 3 network switch in an illustrative embodiment.
Figure 4B:
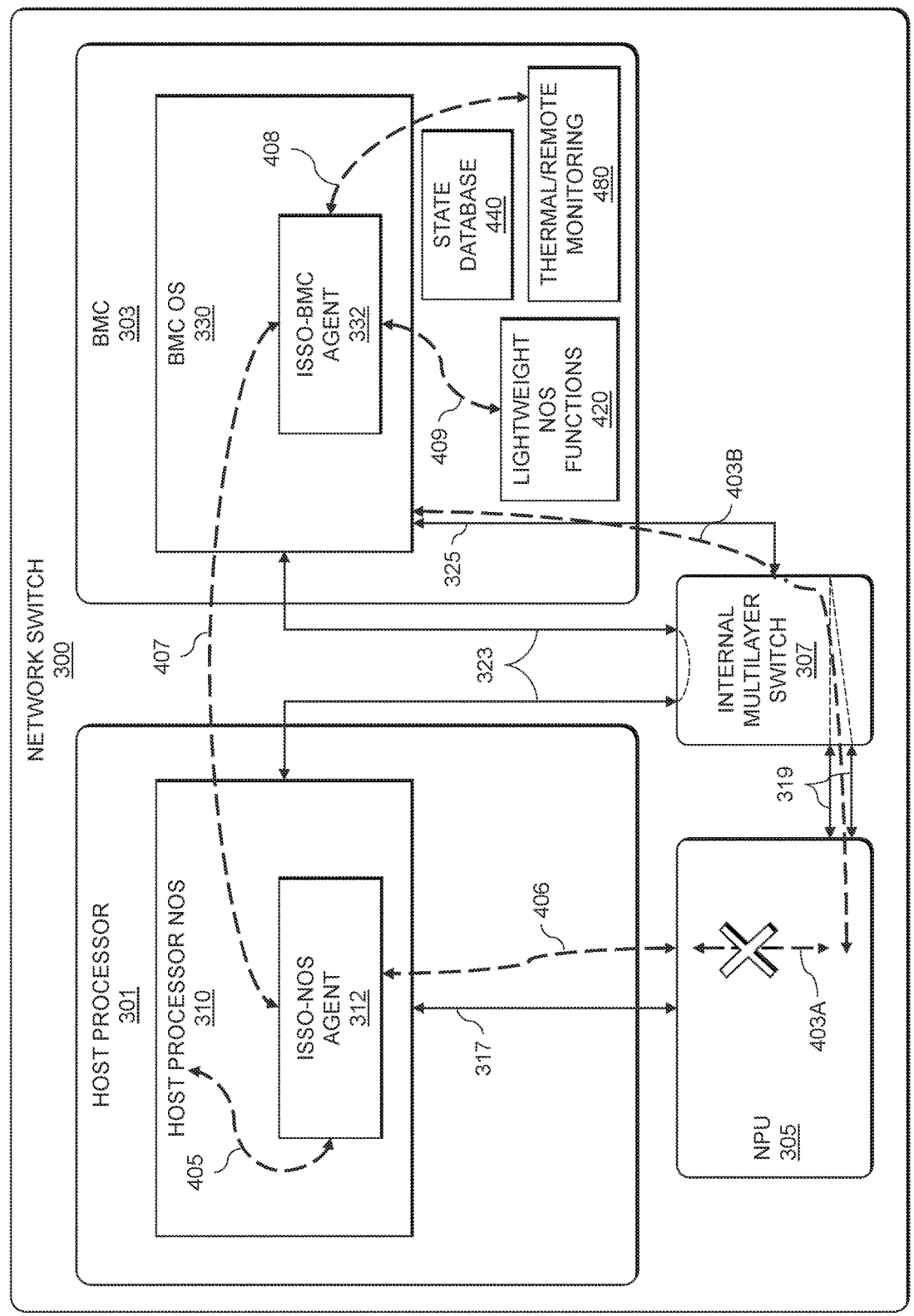

A sequence of events for facilitating ISSO using the network switch 300 will now be described with respect to FIGS. 4A and 4B. FIG. 4A shows a network switch state of the network switch 300 when the host processor NOS 310 is active and the BMC OS 330 is in standby. FIG. 4B shows a network switch state of the network switch 300 after a switch-over when the host processor NOS 310 is inactive and the BMC OS 330 is active. On initialization, the host processor NOS 310 and BMC OS 330 are loaded and ready, and the ISSO-NOS agent 312 is running on the host processor NOS 310. In step 401, an ISSO-BMC bootstrap client 410 on the BMC OS 330 downloads and runs the ISSO-BMC agent 332 on the BMC OS 330. In step 402, the cross-compiled subset of the NOS (e.g., relevant NPU drivers and significant control plane dockers or containers) are installed on the BMC 303 as lightweight NOS functions 420. In steps 403A and 403B, control plane (CoP) traffic is provided from the NPU 305 to the host processor NOS 310 and the BMC OS 330, respectively. The CoP traffic provided in step 403B (e.g., over the link 325, which may be an RCPU link) is dropped at the BMC OS 330 as in FIG. 4A the BMC OS 330 is in standby mode. The ISSO-NOS agent 312 replicates a state DB 440 to the BMC OS 330 (e.g., from the host processor DRAM 314 to the BMC DRAM 334) in step 404. The state DB 440 may include, for example, NPU 305 configuration information, port information, interface tables, FDB tables, ARP tables, routing tables, ACLs, QoS information, etc.

ISSO triggers may be planned or unplanned. Unplanned triggers may include machine check exceptions (MCEs), SSD failures, process trashing, etc. Planned triggers may include user-triggered switch-over (e.g., for planned NOS or firmware upgrade of the host processor NOS 310). The ISSO-NOS agent 312 on the host processor NOS 310 waits on such triggers in step 405 shown in FIG. 4B. When a trigger is received, the ISSO-NOS agent 312 generates a syslog/alarm as appropriate, and shuts down the host processor-NPU link 317 in step 406 (e.g., such that CoP traffic in step 403A is dropped, and the CoP traffic in step 403B gets processed). The ISSO-NOS agent 312 in step 407 notifies the ISSO-BMC agent 332 to start a "warm" boot. The ISSO-BMC agent 332 generates a syslog/alarm as appropriate, and in step 408 controls thermal/remote monitoring 480 (e.g., to set all fans in the fan tray and power supply (PSU) of the network switch 300 to full speed, to disable thermal processes and other monitoring agents and conserve resources of the BMC 303 for use in running the lightweight NOS functions 420). Step 408 may also include starting a hardware watchdog process on the BMC OS 330, which will monitor for the maximum amount of time that the BMC OS 330 is permitted to be the active control plane for the NPU 305. In step 409, the ISSO-BMC agent 332 initializes the lightweight NOS functions 420 (e.g., starting dockers or other containers with the cross-compiled subset of the NOS functionality) in warm boot mode. Since the state DB 440 is in sync (e.g., from step 404), this is equivalent to a warm boot, except that such functionality is restarting from the BMC OS 330 instead of the host processor NOS 310. The CoP traffic starts getting processed in step 403B (e.g., over the RCPU port of link 325).

Following step 409, the host processor NOS 310 is detached from the NPU 305. The host processor NOS 310 may be inspected for debugging, have its firmware upgraded (e.g., Open Networking Installation Environment (ONIE), Basic Input/Output System (BIOS), SSD firmware, etc.) or have any other desired operations performed while not disrupting the BMC-NPU data plane. An end user may be able to login to the BMC OS 330 (e.g., through the shared management port 313 and/or console port 315) to check the system status. Once such operations are completed or a scheduled maintenance window is completed after migrating applications, a warm boot back to the host processor NOS 310 may be performed.

The network switch 300 running the ISSO-NOS agent 312 as part of the host processor NOS 310 on the host processor 301 can advantageously replicate NPU 305 tables and state DB 440 to the ISSO-BMC agent 332 running as part of the BMC OS 330 on the BMC 303 over a dedicated link (e.g., link 319 or 323). Upon specific failure events or under user control, the ISSO-NOS agent 312 shuts down the host processor 301 link to the NPU 305, and instructs the ISSO-BMC agent 332 to become active. The BMC OS 330 then scales down its normal functionality (e.g., such as suspending thermal/remote monitoring 480), enables the link 325 (e.g., an RCPU link) between the NPU 305 and the BMC 303, and warm restarts the control plane on the BMC OS 330.

The technical solutions described herein provide various advantages for redundancy and failover of network switches, overcoming technical problems with conventional approaches. Conventional approaches in modular or chassis-based network switches, for example, may use HiGig/PCIe Non-Transparent bridge ports and custom backplane links which are costly to implement. Further, fixed form factor switches with high availability designs may require homogeneous processors and OS configurations acting as hot, warm or cold standbys. The technical solutions described herein can leverage an IDPC complex or other BMC (running a BMC OS) that can act as an onboard standby control plane when ISSO is required. Prior to ISSO, the IDPC complex or other BMC can handle various other functions (e.g., thermal management, remote access control, firmware upgrades, event/LED management, etc.). A subset of the NOS running in the host processor (e.g., dockers or other containers required for supporting standby control plane functionality, such as Free Range Routing (FRR), Link Layer Discovery Protocol (LLDP), Link Aggregation Control Protocol (LACP), etc.) is used on the BMC to provide control plane functionality for a NPU following ISSO to the BMC. This may include generating dockers or other containers configured to support a platform of the BMC (e.g., an ARM processor platform). User Defined Function (UDF) and Protocol Plane multilayer switch configuration and management may be leveraged to provide internal multilayer switch functionality.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for performing ISSO of functionality of a NOS of a network switch will now be described in greater detail with reference to FIGS. 5 and 6. Although described in the context of system 100, these platforms may also be used to implement at least portions of other information processing systems in other embodiments.

Figure 5:
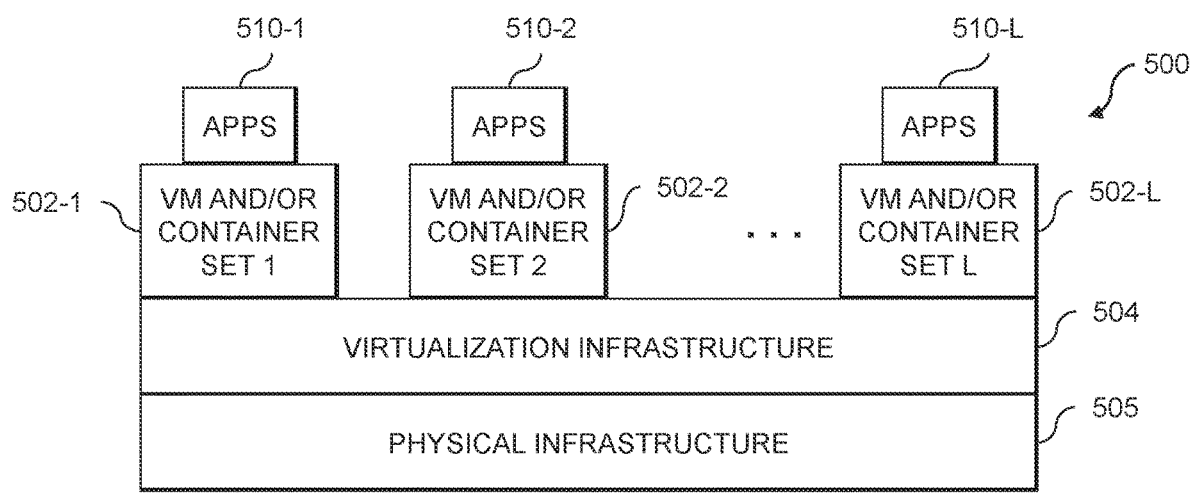
FIGS. 5 and 6 show examples of processing platforms that may be utilized to implement at least a portion of an information processing system in illustrative embodiments.
Figure 6:
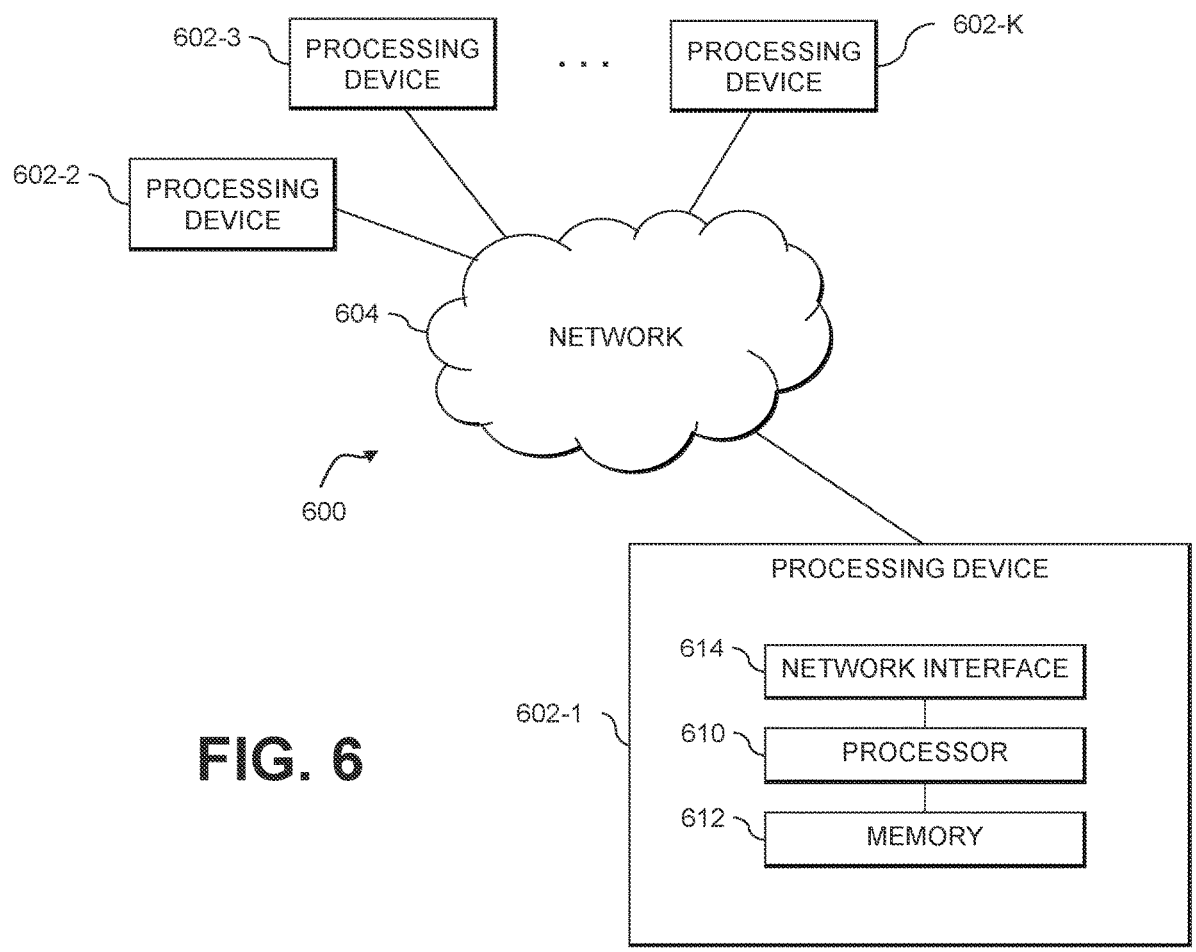

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), network processing unit (NPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for performing ISSO of functionality of a NOS of a network switch as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, network devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a first processing device comprising a processor coupled to a memory;
the first processing device being configured to perform steps of:
managing, in a first mode of operation, one or more first tasks for a network switch;
replicating, in the first mode of operation, state information for a network operating system of the network switch, the network operating system running on a second processing device in the first mode of operation;
initiating, in response to one or more trigger conditions, an in-service switch-over from the first mode of operation to a second mode of operation;
suspending, in the second mode of operation, at least one of the one or more first tasks; and
running, in the second mode of operation, at least a portion of the network operating system utilizing the replicated state information;
wherein the first processing device and the second processing device are components of the network switch.

2. The apparatus of claim 1 wherein the first processing device comprises a baseboard management controller of the network switch, and wherein the second processing device comprises a host central processing unit of the network switch.

3. The apparatus of claim 1 wherein suspending at least one of the one or more first tasks in the second mode of operation comprises:
setting a fan speed of one or more fans of the network switch to a designated speed; and
disabling thermal monitoring of the network switch.

4. The apparatus of claim 3 wherein the designated speed comprises a maximum fan speed.

5. The apparatus of claim 1 wherein the replicated state information comprises at least one of:
port configuration information for one or more ports of the network switch;
one or more interface tables;
one or more routing tables;
one or more forwarding database tables;
one or more address resolution protocol tables;
one or more network access control lists; and
quality of service policy information.

6. The apparatus of claim 1 wherein running said at least a portion of the network operating system utilizing the replicated state information comprises running a subset of functionality of the network operating system, the subset of the functionality of the network operating system comprises management of a control plane of a network processing unit of the network switch, the network processing unit being coupled to a plurality of ports of the network switch.

7. The apparatus of claim 6 wherein the subset of the functionality of the network operating system comprises one or more drivers for the network processing unit of the network switch and one or more software containers providing control plane functionality for the network processing unit of the network switch.

8. The apparatus of claim 1 wherein the one or more trigger conditions comprise at least one of:
a planned trigger condition associated with a user-initiated switch-over for enabling one or more upgrades of the network operating system running on the second processing device; and
an unplanned trigger condition associated with a failure of the network operating system running on the second processing device.

9. The apparatus of claim 1 wherein the first processing device is further configured to perform a step of initiating an additional in-service switch-over from the second mode of operation back to the first mode of operation, the additional in-service switch-over being performed in response to one or more other trigger conditions.

10. The apparatus of claim 9 wherein at least one of the one or more other trigger conditions comprises expiration of a designated period of time since the in-service switch-over from the first mode of operation to the second mode of operation.

11. An apparatus comprising:
a first processing device comprising a processor coupled to a memory;
the first processing device being configured to perform steps of:
managing, in a first mode of operation, one or more first tasks for a network switch;
replicating, in the first mode of operation, state information for a network operating system of the network switch, the network operating system running on a second processing device in the first mode of operation;
initiating, in response to one or more trigger conditions, an in-service switch-over from the first mode of operation to a second mode of operation;
suspending, in the second mode of operation, at least one of the one or more first tasks; and
running, in the second mode of operation, at least a portion of the network operating system utilizing the replicated state information;
wherein the one or more first tasks for the network switch comprises one or more thermal management tasks, and wherein suspending at least one of the one or more first tasks in the second mode of operation comprises suspending the one or more thermal management tasks.

12. An apparatus comprising:
a first processing device comprising a processor coupled to a memory;
the first processing device being configured to perform steps of:
managing, in a first mode of operation, one or more first tasks for a network switch;
replicating, in the first mode of operation, state information for a network operating system of the network switch, the network operating system running on a second processing device in the first mode of operation;
initiating, in response to one or more trigger conditions, an in-service switch-over from the first mode of operation to a second mode of operation;
suspending, in the second mode of operation, at least one of the one or more first tasks; and
running, in the second mode of operation, at least a portion of the network operating system utilizing the replicated state information;
wherein the network switch comprises a network processing unit;
wherein the network processing unit is coupled to the first processing device over a first link; and
wherein the network processing unit is coupled to the second processing device over a second link different than the first link.

13. The apparatus of claim 12 wherein the first link comprises a remote central processing unit (RCPU) link and the second link comprises a peripheral component interconnect express (PCIe) link.

14. The apparatus of claim 12 wherein the first processing device is coupled to the second processing device over a third link different than the first link and the second link.

15. A computer program product comprising a non-transitory processor-readable storage medium having stored therein program code of one or more software programs, wherein the program code when executed by a first processing device causes the first processing device to perform steps of:
managing, in a first mode of operation, one or more first tasks for a network switch;
replicating, in the first mode of operation, state information for a network operating system of the network switch, the network operating system running on a second processing device in the first mode of operation;
initiating, in response to one or more trigger conditions, an in-service switch-over from the first mode of operation to a second mode of operation;
suspending, in the second mode of operation, at least one of the one or more first tasks; and
running, in the second mode of operation, at least a portion of the network operating system utilizing the replicated state information;
wherein the first processing device and the second processing device are components of the network switch.

16. The computer program product of claim 15 wherein the first processing device comprises a baseboard management controller of the network switch, and wherein the second processing device comprises a host central processing unit of the network switch.

17. The computer program product of claim 15 wherein running said at least a portion of the network operating system utilizing the replicated state information comprises running a subset of functionality of the network operating system, the subset of the functionality of the network operating system comprises management of a control plane of a network processing unit of the network switch, the network processing unit being coupled to a plurality of ports of the network switch.

18. A method performed by a first processing device comprising a processor coupled to a memory, the method comprising steps of:
managing, in a first mode of operation, one or more first tasks for a network switch;
replicating, in the first mode of operation, state information for a network operating system of the network switch, the network operating system running on a second processing device in the first mode of operation;
initiating, in response to one or more trigger conditions, an in-service switch-over from the first mode of operation to a second mode of operation;
suspending, in the second mode of operation, at least one of the one or more first tasks; and
running, in the second mode of operation, at least a portion of the network operating system utilizing the replicated state information;
wherein the first processing device and the second processing device are components of the network switch.

19. The method of claim 18 wherein the first processing device comprises a baseboard management controller of the network switch, and wherein the second processing device comprises a host central processing unit of the network switch.

20. The method of claim 18 wherein running said at least a portion of the network operating system utilizing the replicated state information comprises running a subset of functionality of the network operating system, the subset of the functionality of the network operating system comprises management of a control plane of a network processing unit of the network switch, the network processing unit being coupled to a plurality of ports of the network switch.

* * * * *